(12) United States Patent
Emma et al.

(10) Patent No.: US 7,249,358 B2
(45) Date of Patent: Jul. 24, 2007

(54) METHOD AND APPARATUS FOR DYNAMICALLY ALLOCATING PROCESSORS

(75) Inventors: Philip G Emma, Danbury, CT (US); Allen P Haar, Essex Junction, VT (US); Paul D Kartschoke, Williston, VT (US); Barry W Krumm, Poughkeepsie, NY (US); Norman J Rohrer, Underhill, VT (US); Peter A Sandon, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 10/248,303

(22) Filed: Jan. 7, 2003

(65) Prior Publication Data

US 2004/0133892 A1 Jul. 8, 2004

(51) Int. Cl.
*G06F 9/46* (2006.01)
*G06F 9/30* (2006.01)
*G06F 11/00* (2006.01)

(52) U.S. Cl. ............... 718/105; 718/104; 712/220; 714/1

(58) Field of Classification Search ........ 718/104–105; 712/220; 714/1
See application file for complete search history.

(56) References Cited

U.S. PATENT DOCUMENTS 5,689,632 A * 11/1997 Galy et al. ............... 714/11
2003/0046615 A1* 3/2003 Stone .......................... 714/47

* cited by examiner

*Primary Examiner*—Meng-Al T. An
*Assistant Examiner*—Kenneth Tang
(74) *Attorney, Agent, or Firm*—Michael J. Lestrange

(57) ABSTRACT

A computer system having a plurality of processors where each of the processors is dynamically assigned for execution of tasks based upon either performance or reliability.

14 Claims, 3 Drawing Sheets

METHOD AND APPARATUS FOR DYNAMICALLY ALLOCATING PROCESSORS

BACKGROUND OF INVENTION

1. Technical Field

The present invention generally relates to systems having multiple processors, and more particularly, to systems having multiple processors where the resources of the processors are dynamically allocated.

2. Related Art

In today's fast moving electronic based environments, the consumer has continued to demand both increased speed and increased reliability. In order to fulfill these desires, the industry has adopted an approach that uses redundant components in a system where parallel processing can be performed. Unfortunately, duplicated components of these systems have been designed in a static state so that they either operate in parallel for speed or perform redundant operations for reliability. If a user was not concerned about size or cost, these types of designs would suffice.

For example, multi-processor systems that support both reliability and performance are currently designed by assigning one set of dedicated processors for performance based operations, and another set of dedicated processors for reliability based operations. The cost associated with these additional redundant processors can become quite substantial. Furthermore, since the systems are static, the consumer is unable to change the configuration or allocation of the processors for either reliability or performance without purchasing a new system.

In yet another example, the performance of the processors themselves can also be increased by adding duplicate components (e.g. Floating point execution units) for parallel execution.

It would, therefore, be a distinct advantage to have an electronic device that has duplicate components that could be dynamically assigned to a task based upon either performance or reliability purposes. The present invention provides such a device.

SUMMARY OF INVENTION

The present invention is applicable to any device that has duplicate components residing therein. The present invention dynamically assigns tasks to the duplicate components based upon either performance or reliability objectives.

In one aspect, the present invention is a computer system having a plurality of microprocessors where each one of the microprocessors is dynamically assigned a task based upon either performance or reliability.

In yet another aspect, the present invention is a processor having duplicate execution units where each one of the duplicate execution units is assigned a task based upon either performance or reliability.

BRIEF DESCRIPTION OF DRAWINGS

The present invention will be better understood and its numerous objects and advantages will become more apparent to those skilled in the art by reference to the following drawings, in conjunction with the accompanying specification, in which.

DETAILED DESCRIPTION

In the following description, well-known circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

The present invention is applicable to any device that has duplicate components residing therein. The present invention dynamically assigns tasks to the duplicate components based upon either performance or reliability. Although specific embodiments are shown and described below for implementing such a device, the present invention is not intended to be limited to these particular embodiments, but is equally applicable to any device having duplicate components.

Figure 1:
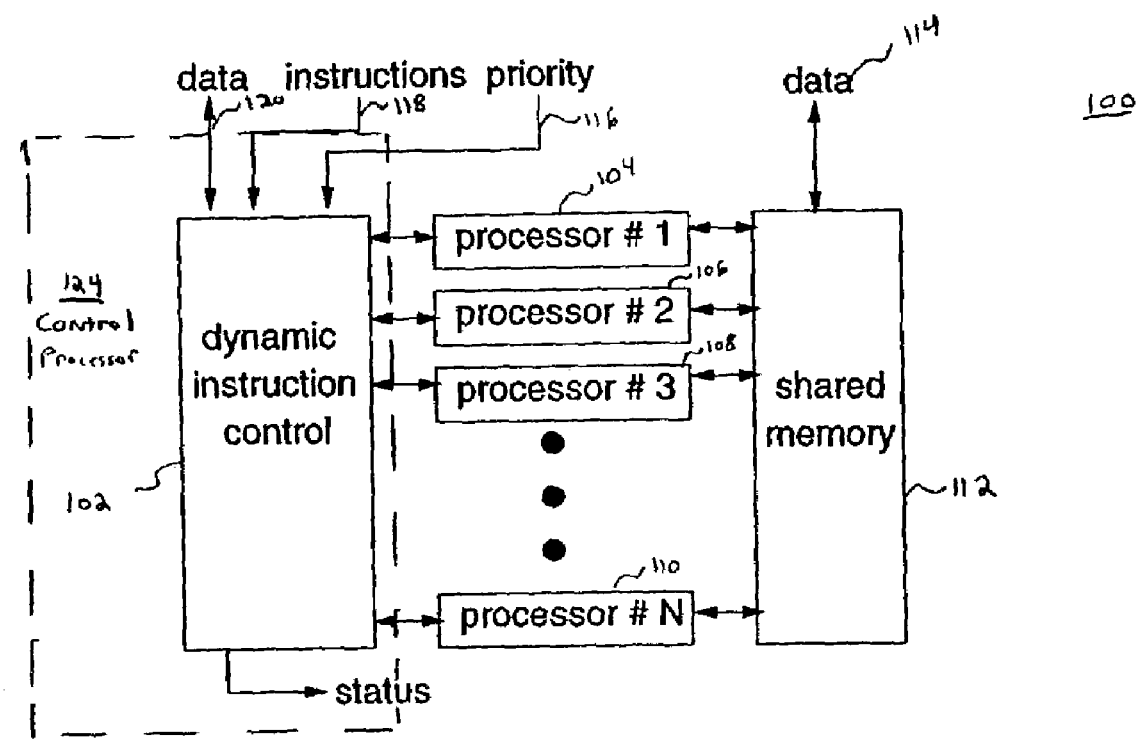
FIG. 1 is a schematic diagram illustrating a multiprocessor system according to the teachings of a preferred embodiment of the present invention.

Reference now being made to FIG. 1, a schematic diagram is shown illustrating a multiprocessor system 100 according to the teachings of a preferred embodiment of the present invention. The multiprocessor system 100 includes processors 1-N (104-110), shared memory 112, a dynamic instruction control unit 102, and a control processor 124. The processors 1-N (104-110) execute and/or perform some number of logical operations, and each one has access to shared memory 112 to access identical data when required. Each processor 1-N (104-110) may be a single processing unit, or may itself be multiple processing units sharing a cache memory, and optionally can contain a checksum register for more granularity when required.

The dynamic instruction control unit 102 is illustrated as residing within the control processor 124, but it could also be a separate unit reporting the status to the control processor 124 as well. The dynamic instruction control unit 102 oversees the distribution of instructions and data, under normal and error conditions. The dynamic instruction control unit 102 is responsible for receiving data 120, instructions 118 to perform on the data 120, and a desired operation priority 116, and then to schedule the calculation and report the calculation status 122 back to the control processor 124. The control processor, then, is responsible for establishing the priority of instructions, and for handling unusual situations as indicated by the status, such as errors that cannot be resolved otherwise. The operation of the dynamic instruction control unit 102 is best explained by way of example, and is described as such in connection with FIG. 2.

Figure 2:
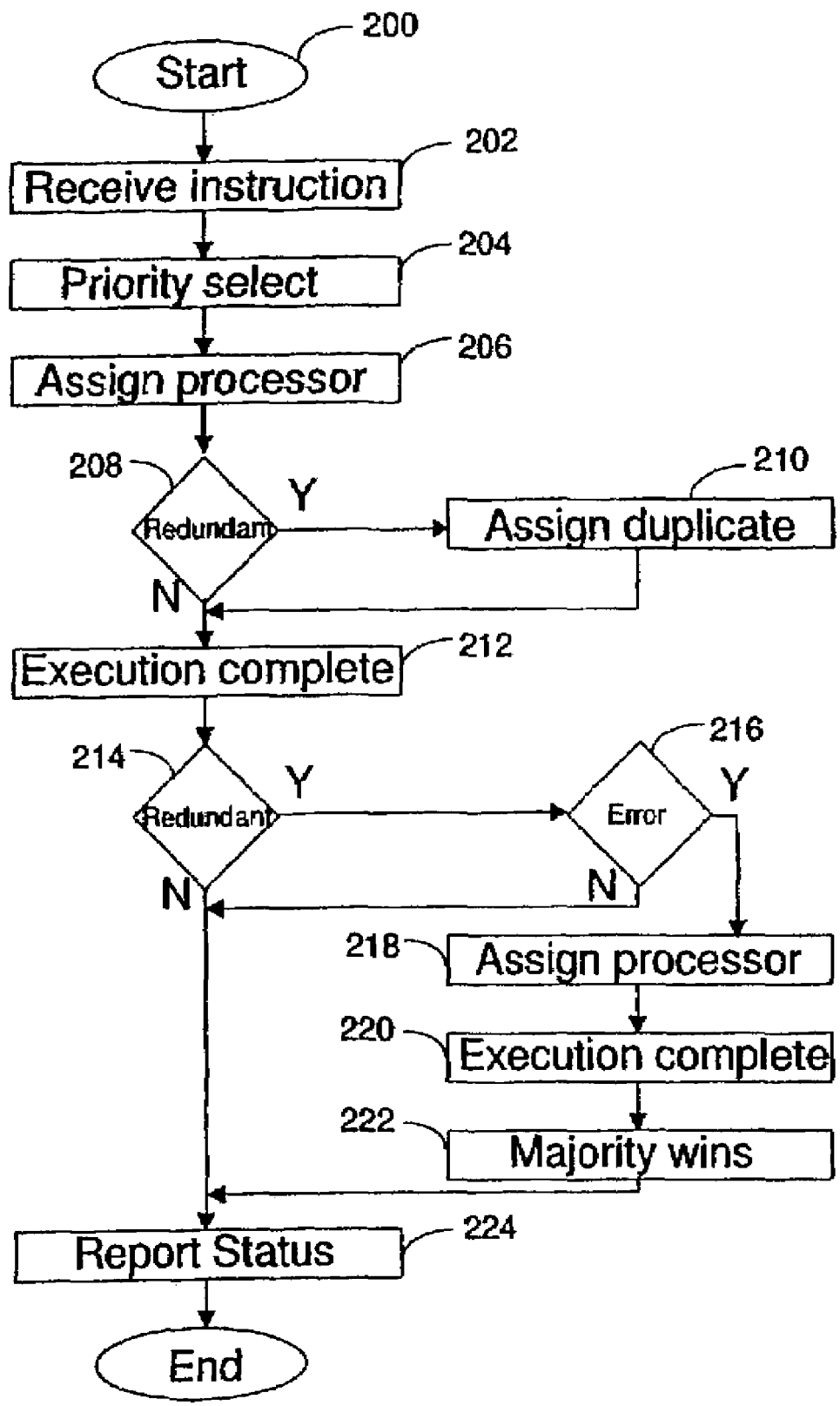
FIG. 2 is a flow chart illustrating the method that the Dynamic Instruction Control (DIC) unit of FIG. 1 uses for dynamically assigning the processors 1-N of FIG. 1 according to the teachings of the present invention.

FIG. 2 is a flow chart illustrating the method the Dynamic Instruction Control (DIC) unit 102 of FIG. 1 uses for dynamically assigning the processors 1-N (104-110) according to the teachings of the present invention. The function of the DIC unit 102 is best explained by way of example. Assume for the moment that the user has specified maximum speed without any redundancy (error protection). In this example, the DIC unit 102 receives a set of instructions for execution (step 202). The DIC unit 102 determines which instruction to execute next based on the corresponding priority values (step 204). The DIC unit 102 assigns the next available processor 1-N (104-110) to execute the highest priority instruction (step 206). There is no redundancy required (steps 208 and 214) so, once the execution completes (step 212), the status of the execution is reported to the control processor 124 (step 224). The above noted process would be repeated in this example for each instruction received by the DIC 102.

Now assume that the user has specified some level of redundancy for certain instructions such as calculations. When the DIC 102 receives one of these instructions (step 202), assuming no higher priority instruction is available (step 204), the next available processor 1-N (104-110) is assigned to execute the instruction (step 206). However, since the user has specified redundancy (step 208), the DIC also assigns at least one additional processor 1-N (104-110) for duplicate processing of the instruction. It should be noted that many different methods for ensuring redundancy can be used with the present invention (for example 3 processors from the start with voting at the end), and the particular method used in this example is not to be considered a limitation but merely an example of how such redundancy can be implemented.

Once execution has completed for the assigned processors 1-N (104-110), the results for the processors are compared one to another (steps 212, 214, and 216). If the results are different, then the DIC 102 assigns the next available processor 1-N (104-110) to execute the instruction a third time (step 218). After the execution completes (step 220), the DIC 102 compares the result to the results obtained from the previous two executions, and the matching result is used as correct and reported (step 224). If all of the results are different from one another, then an error condition is reported (step 224).

As a further example, assuming that multiple instructions are received by the DIC 102 where some have strict integrity constraints while others do not, the processors 1-N (104-110), can be dynamically assigned for the instructions accordingly. For example, in a 10 processor system, three high integrity processes can be assigned to six processors, while the other four processors can be assigned to the remaining instructions to achieve high throughput.

It should also be noted that the dynamic instruction control unit 102 can delay execution in one processor with respect to parallel execution in a second processor, in order to provide some immunity to more global transient sources of errors, such as voltage spikes.

While the previous examples have been focused on single instructions, a coarser granularity, at the process, task or transaction level is also supported by the dynamic instruction control unit 102. The point at which results must be compared (step 216) is the point at which a result is computed that is to be used outside the current computation. Transaction processing, for example, would require this comparison at the commit phase of processing.

To support the coarser granularity a checksum register in the processor is used to compute a checksum over a computation. First, a checksum register is cleared at the beginning of the computation. This is done with a synchronizing instruction that insures all instructions preceding it complete before this instruction executes. On each cycle, the checksum is updated using some function of the current checksum and the computation state. For example, the exclusive-or of the checksum register, the virtual data address, and the data stored for each store instruction would give a check of the results written to memory. Additional checking could include the instruction address and result data from computations, if the data of the processor, and not just the program output, is desired to match. At the end of the computation, a freeze checksum instruction causes the checksum register to hold its contents. This is also a synchronizing instruction.

The use of the checksum on a high reliability low worst case latency application, results, in the preferred embodiment, in each thread being dispatched to three processors. As each processor completes its checksum guarded computation, it stores the checksum and updates a semaphore. When the third processor completes the computation, it runs the checksum compare code. Assuming that at least two checksums match, the result of the calculation from one of those two matching processors is committed.

If lowest worst case latency is not critical, better throughput can be had using two of the N processors at a time for checksum guarded computation, and if an error is detected, a third processor is used to break the tie (similarly, in a single processor system, a checksum guarded computation can be executed twice, and checksums compared to detect an error, followed by a third iteration, if needed to break a tie.).

Figure 3:
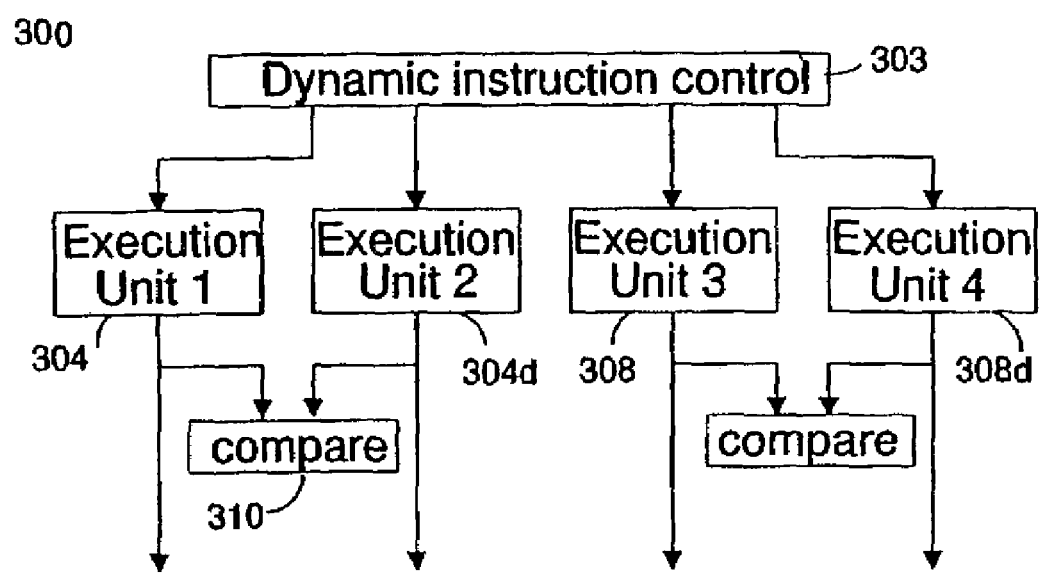
FIG. 3 is a schematic diagram illustrating the use of the dynamic instruction control unit at the execution unit level of a processor according to the teachings of the present invention.

Reference now being made to FIG. 3, a schematic diagram is shown illustrating the use of another embodiment of the dynamic instruction control unit 303 at the execution unit level of a processor 300 according to the teachings of the present invention. In this particular embodiment, there would be two execution units of the same type (i.e. they perform the same function). Execution units 304 and 304*d* perform the same function, and 308 and 308*d* perform the same function between themselves which is different from that of 304 and 304*d*. The processor 300 includes a machine state bit 312 to indicate fault detect mode. If the fault detect mode is set, then the dynamic instruction control unit 303 operates in a manner similar to DIC 102 of FIG. 1. Mainly, that every instruction is sent to a similar pair (e.g. 304 and 304*d*) of execution units that have hardware compare logic 310 to check the two results. If the fault detect mode is off, then the dynamic instruction control unit 303 assigns different instructions to each execution unit of a similar pair, thus, allowing parallel execution and increasing throughput.

For example, it is common to design a superscalar processor with multiple instances of each type of execution unit to take advantage of instruction level parallelism and achieve high performance. With the fairly limited design change described here, such processors could be dynamically configured as high reliability processors whenever the application required it.

It should be noted that the processor implementation of FIG. 3 assumes that the software is indicating which sections of code are to be considered critical.

It is thus believed that the operatioconstruction of the present invention will be apparent from the foregoing description. While the method and system shown and described has been characterized as being preferred, it will be readily apparent that various changes and/or modifications could be made without departing from the spirit and scope of the present invention as defined in the following claims.

The invention claimed is:

1. A computer system comprising:
    a plurality of processors adapted to execute instructions based on a performance metric or a reliability metric; and
    an instruction control unit to receive instructions and to dynamically assign each one of the instructions to the plurality of processors for redundant execution by at least two of the processors according to the reliability metric, and dynamically assigns each one of the remaining received instructions for execution to each one of the remaining processors according to the performance metric, wherein the results of the redundant execution of the instruction according to the reliability metric are different from one another, and the instruction control unit assigns another one of the processors to execute the received instruction.

2. The computer system of claim 1 wherein the instruction control unit dynamically assigns each one of the received instructions to at least two of the processors for execution based upon the reliability metric.

3. The computer system according to claim 1, wherein the reliability metric comprises executing an instruction on a first processor and executing the same instruction on a second processor, comparing the results and reporting any differences in the results.

4. The computer system of claim 1, wherein the instructions comprise executable micro code instructions.

5. The computer system according to claim 1, wherein the reliability metric comprises employing a triple modular redundancy scheme with a voting mechanism to compare results and identify processing errors.

6. The computer system according to claim 5, wherein the voting mechanism further comprises a checksum comparison to determine a final result of the executed instructions.

7. The computer system according to claim 1, wherein each of the plurality of processors comprises a microcontroller or microprocessor.

8. The computer system according to claim 1, wherein the reliability metric comprises executing an instruction multiple times on a first processor and performing a redundancy check to compare results between the first execution and the second execution and identifying any errors.

9. The computer system according to claim 1, wherein the performance metric comprises separating a sequence of instructions and executing the separated instructions on two or more processors configured in parallel, and providing results of the executed instructions to another processor.

10. The computer system according to claim 1, wherein each instruction is tagged with a priority or reliability constraint identifier and dispatched by the instruction control unit to a processor.

11. The computer system according to claim 1, wherein a plurality of instructions are tagged with a common priority or reliability constraint identifier and dispatched by the instruction control unit as contiguous sequence.

12. A microprocessor comprising:
at least two execution units capable of performing the same function and adapted to execute instructions based on a performance metric or a reliability metric; and
an instruction control unit to receive instructions and to dynamically assign one of the received instructions for redundant execution by each of the at least two execution units based on the reliability metric, wherein the results of the redundant execution of the received instruction are different from one another, and the instruction control unit assigns another one of the processors to execute the received instruction.

13. The microprocessor of claim 12 wherein the instruction control unit assigns each one of the received instructions to each of the at least two execution units based on the performance metric.

14. The microprocessor of claim 13 further comprising:
at least one additional execution unit for performing a function different from that of the at least two execution units;
wherein the instruction control unit assigns each one of the received instructions to the at least two execution units for execution based upon a defined reliability metric, and assigns another one of the received instructions to the additional execution unit for execution based upon a defined performance metric.

* * * * *